Feb. 27, 1968                R. A. CUNNINGHAM                3,370,472
                    SIMPLIFIED PARTICLE CONTAINMENT DEVICE
Filed March 26, 1964                                    4 Sheets-Sheet 1

INVENTOR.
ROBERT A. CUNNINGHAM
BY
Julian C. Renfro
ATTORNEY

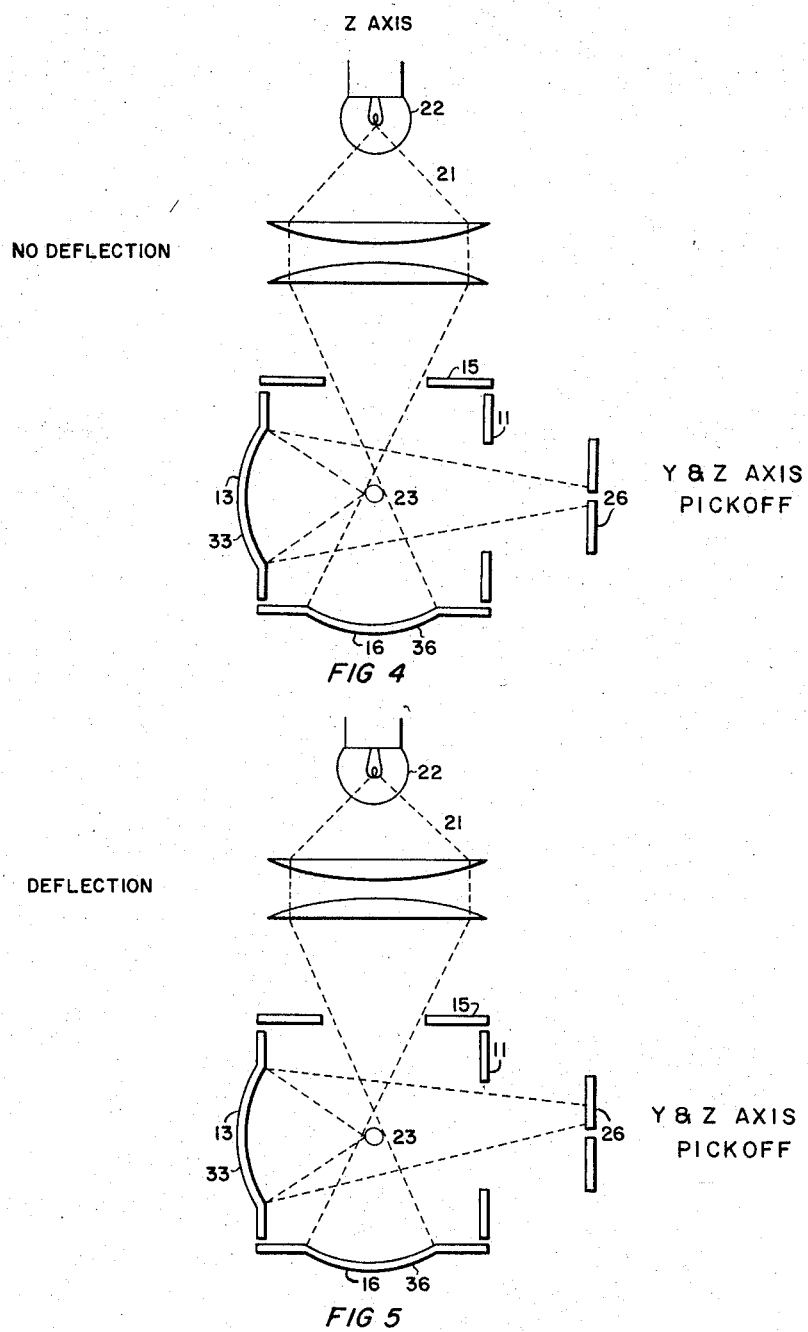

Feb. 27, 1968  R. A. CUNNINGHAM  3,370,472
SIMPLIFIED PARTICLE CONTAINMENT DEVICE
Filed March 26, 1964  4 Sheets-Sheet 4

INVENTOR.
ROBERT A. CUNNINGHAM
BY
Julian C. Penfro
ATTORNEY

United States Patent Office 3,370,472
Patented Feb. 27, 1968

3,370,472
SIMPLIFIED PARTICLE CONTAINMENT DEVICE
Robert A. Cunningham, Orange County, Fla., assignor to Martin-Marietta Corporation, Middle River, Md., a corporation of Maryland
Filed Mar. 26, 1964, Ser. No. 354,919
9 Claims. (Cl. 73—517)

This invention relates to a sensing device for measuring forces such as accelerations, and more particularly to a device utilizing a charged particle suspended in three dimensional stable equilibrium by an electrostatic field which will sense and provide a measure of acceleration in three dimensions with very high accuracy. This invention is rather closely related to my earlier application entitled "Particle Reference Device," filed Aug. 27, 1962, and bearing Ser. No. 219,648, now Patent No. 3,206,987. However, in that earlier case I utilized an AC field, which I have found is not preferred in some instances.

It has been the goal of sensor designers to evolve a device that is free of all forces, except the physical force to be measured. For the measurement of acceleration, the most commonly used sensor involves a mass suspended by a relatively nondissipating suspension in a relatively nondissipating medium.

The ideal suspension involves the use of an electric force which is effective only upon the surface of the suspended charged mass, which is to be contrasted with magnetic forces, which operate upon the entire volume of material and thus incur losses such as hysteresis and eddy current losses. Electric and magnetic forces which avoid physical contact with the material in the suspension involve Earnshaw's law, which rules out a static suspension of a charged mass by truly static forces of either type.

In order to be an integral portion of a useful device, the suspended charged mass must be supported in a stable equilibrium, which requires that the suspension forces change in response to the external force environment. One method of changing these forces or making them respond is to use a servo arrangement, which in this invention is employed to change the electrostatic field in response to the particle position.

A particle in an electric field will be acted on by a force which is defined by the product of the charge on the particle and the field gradient. Thus, $$F = Ee$$

where $F$ = force, $E$ = field gradient and $e$ = charge on the particle. When the device is accelerated, the particle experiences another force which is the product of the acceleration and the mass of the particle. Thus $$F = ma$$

where $F$ = force, $m$ = mass and $a$ = acceleration.

It will therefore be seen that two forces are acting on the particle and the total force is equal to the sum of the two forces, or $$F_{total} = ma + Ee$$

Unless the two forces are maintained equal and opposite the resultant force will cause the particle to move and hit the chamber wall. Therefore, to achieve suspension in my invention the electrical force is controlled to be always equal and opposite to the inertial force so that the resultant is zero at all times, or in other words:

$$ma - Ee = 0$$
or
$$ma = Ee$$

To maintain equality it is necessary to provide a control system which instantaneously adjusts the electric field in three dimensions so that the inertial force is instantaneously and continuously balanced by the electric force. Such a control system as used in my invention determines the equality of the two fields in a unique and useful manner.

Any control system must have an information output which measures the quantity to be controlled. In this case the position of the particle is the measured quantity, and to measure position, it is necessary to compare against a standard. The measurement of position in this invention is accomplished by comparing the particle position optically with a line on a quadrant photo-cell. The position of the dividing lines on the quadrant photo-cell determines the position of null in a force balance servo system.

A position signal is derived from the optical pickoff and amplified to provide a voltage which is fed back to the plates of the chamber to provide an electrostatic field to balance the inertial forces. This will hereinafter be referred to as a servoing arrangement. Position signals are supplied in a three coordinate system to give X, Y, and Z axis signals and these are amplified in separate amplifiers to drive a corresponding set of plates on opposite sides of the chamber. Thus the particle is suspended in an apparently stationary condition without contact with any solid matter, with the voltages supplied to each set of eelctrodes being proportional to acceleration in any direction and being resolved into a multi-coordinate system.

It should be noted at this point that the inherent advantages of electrical suspension methods have long been recognized by the designers of inertial sensors, but the suspension of large masses, such as the hollow sphere used in existing electrostatic gyros requires extremely high electric gradients. These gradients can only be supported in an ultra high vacuum, which is a demand that adds considerably to design problems. These gradients also must be used with very small gaps if reasonable voltages are to be obtained and this type of construction demands the very best in precision and temperature controls to prevent spring torques and temperature drift. The Nordsiek Patent No. 3,003,356 is illustrative of a device designed to try to cope with these problems.

The present invention avoids these and other problems by using a charged particle of high surface-to-volume ratio. Since electrical forces are acting on the surface area to support the particle whose mass is dependent upon its volume, the area-to-mass ratio is an indication of the gradient required, which is comparatively small. The area of a body is a function of the square of the dimensions while the volume or mass is of course a function of cube of the dimension, so area-to-mass ratio increases as the linear dimensions decreases. This also relates to charge-to-mass ratio, and when carried to the ultimate, results in the tremendous charge-to-mass ratio of the electron.

In order to secure the advantages of this new technique, I found it best to employ a particle large enough to be detected by optical means, but small enough to have a large charge-to-mass ratio and thus permit the use of reasonable suspension voltages. The use of particles ranging in size from 2.5 to 250 microns requires gradients of 30 volts per centimeter per G. This is to be contrasted with gradients approaching one million volts/cm. commonly required for electrostatic gyros of the type presently in use. The sizes given are not restrictive, as particles of higher charge-to-mass ratio or smaller size such as ions or molecules may be used.

An acceleration sensing device utilizing my concepts may comprise at least three substantially orthogonally disposed electrodes defining a suspension system by means of which a particle of high charge to mass ratio is supported and with respect to which the particle may move in response to accelerations. The suspension system includes means for selectively providing voltages to the electrodes to hold the particle at a null point common to the electrodes, and optical pickoff means are provided for sensing deviations of the particle from the null point. Amplification means are utilized for amplifying the output signals from the pickoff and for applying a counter electric force to the appropriate electrodes to maintain the particle in the null position, with means being present for utilizing as a readout of acceleration the signal necessary to null out the particle.

In this instance, the arrangement can be such that the electrodes hold the particle in the null position either by using attraction or repulsion forces. The charged particle preferably is in the form of a glass bead some 75 microns in diameter that has been charged to a potential of approximately 5,000 volts and placed in the electrode array.

A preferred embodiment of my invention employs a plurality of electrodes utilized in pairs to define an essentially closed array, with means providing an electrostatic suspension system between the electrodes so that said particle will be maintained at a null location preferably in the approximate center of the array. A force balance arrangement maintains the particle essentially in said null position despite substantial accelerations to which said device may be subjected, this force balance arrangement including optical pickoff means for sensing movements of said charged particle as a result of accelerations. Amplification means are provided to which said pickoff is arranged to supply output signals, and the output of said amplification means is applied to the electrode pair most nearly relatable to the direction in which, as a result of acceleration, the particle is tending to move, thereby to cause said particle to remain near the null position. Because of this arrangement, the particle remains substantially in the null position in the electrode array so as to be able to sense accelerations in any direction, with means being provided for indicating the acceleration to which said device is subjected by virtue of the amount of voltage required to balance out said particle and return it to the null position.

As will therefore be understood, the particle is acted upon by both inertial forces and electrical forces, and the optical pickoff devices sense the resultant particle motion and bring about an input that when amplified enables the servo arrangement to balance the electrical forces against the inertial forces to maintain the particle at the null position. The null position is usually preferred to be substantially in the center of the array of electrodes. Since for balance the electrical forces must equal the inertial forces, it is apparent that once the particle is in stable equilibrium, the electrical forces can thereafter be used to measure and provide a readout of the inertial forces. Thus the electrical output is proportional to the acceleration of the instrument, and represents the useful output of the device.

The exemplary embodiment of this invention utilizes six plates, each of which is slightly separated from the adjacent plates of the cubic array. Two optical pickoffs are arranged to sense position in the X, Y, and Z coordinates, which lie along the axis perpendicular to each set of plates. A source of light is focused to illuminate the particle, which would be viewed as merely a bright point. The illuminated particle will cause light to be reflected from spherical mirrors in the chamber and form an image on the surface of the respective quadrant photo-sensors. The image of the particle or the photo-sensors will generate an electrical signal which when amplified will be applied to the electrodes to give an electrical force to oppose the inertial force. This is of course accomplished automatically and quite rapidly.

The acceleration sensor according to this invention is not confined to use in relationships in which the plane of its plates are disposed in any particular manner with respect to an acceleration input, which is a quality that admirably equips this device for use in missile environments and other environments in which G forces may be high and from any direction. It is also important to note that my accelerometer is not limited to the measurement of acceleration in a single direction only, for it has adequately proven to be accurate for the indication of accelerations in three orthogonal directions, or differently stated, it can measure acceleration in any direction.

As an example of the use of this device, assume that it is desired to measure the acceleration forces acting upon a missile during flight. In this instance, my acceleration sensor would be mounted on the missile body and would give an indication of the magnitude of the acceleration of the missile by the voltage required to balance the acceleration, with such voltage accurately indicating the total accelerations acting upon the missile, and direction of accelerations by the magnitude of the voltages with respect to the three orthogonal axes. Such voltages can of course be effectively used in the control of the missile.

It is important for a proper understanding of my device to realize that no AC field is involved either in its commencement of operation or in its operation as an accelerometer. This is of course to be contrasted with the device set forth at length in the Langmuir et al. Patent No. 3,065,640, wherein a somewhat related device is set forth but which requires an electrodynamic containment of a charged particle. The difference between that device and the present invention is most significant, for the present invention is far more responsive and does not suffer the disadvantage of being limited by the frequency of the AC electrodynamic suspension.

Similarly, the aforementioned Nordsiek patent using a large spherical proof mass is based on the principle of induced separation of charge to furnish the suspension forces. This force varies with position in an exponential manner in contrast with my invention, which utilizes attraction and repulsion of a net charge to achieve a linear relationship between force and position.

As to the operation of my device, a particle must first be launched into the electrode chamber. This is accomplished by using a glass tube containing a large number of particles placed with an electrode to supply a pulse of five kilovolts of either negative or positive polarity. This pulse of voltage will cause the particles to be projected in all directions, and the glass tube will serve to direct one or more particles out the end of the tube and into the electrode chamber. The first particle properly entering the chamber will be captured and illuminated by the lamp focused to provide an area of bright light in the center of the chamber, and such particle will appear as a very bright point of light. The illuminated particle will cause light to fall into the two spherical mirrors which will focus an image of the particle on the quadrant photo sensors. The particle being a mass, is subjected to inertial forces, and being charged will also experience electrical forces. Gravity will of course act on the particle to tend to make it fall out of the chamber. The chamber in which the electrodes are disposed is preferably evacuated in order to minimize viscous damping forces.

The image of the particle will move to follow the particle and thus move to one quadrant of the photo sensor. The illuminated quadrant will be electrically contrasted with the non-illuminated quadrant to show a large unbalance of electrical output. For example the quadrant can be constructed from a diffused junction of silicon semi-conductor which exhibits photo-voltaic characteristics and is responsive to light falling on its surface. The output of the quadrant as used with the X, Y, or Z axis is a current which is amplified by an operational amplifier. The outputs of each portion of the quadrant is subtracted in a different amplifier, and a phase inverter is used to modify the output of this differential amplifier and allow the driving of a push-pull DC amplifier which forms the output stage of this servo system. The output is then applied to the set of plates in the six electrode chamber with the result that the particle will be properly suspended, and forces provided to counteract the motion caused by the force of gravity.

It is of course to be understood that this same action is accomplished in three channels which are oriented to supply forces in three mutually perpendicular directions. Thus the particle is instantaneously and continuously maintained at a fixed stable position inside of the cubic electrode array, this position being determined by the optical system and its relationship to the quadrant photo sensor.

As will be obvious to one skilled in the art, the primary application of my invention is as a highly sensitive and accurate accelerometer. However, it can be used equally well in any application requiring the measurement of very small forces. For example, a magnetic particle can be suspended and used as a magnetometer or a device for exploring magnetic fields. By the addition of electrodes which can be connected to external voltages, this device can be used as a very sensitive electrometer. Another very useful application is the measurement of radiometer effect. Since the particle can be suspended in gases at various pressures it is possible to measure their reaction of the particle with these gases while exposing the particles to different types of radiation.

It is therefore a basic object of my invention to provide a suspension device for suspending a charged particle in stable equilibrium by instantaneously and continuously balancing disturbing inertial forces by the use of opposing electrical forces.

It is another obect of this invention to provide an electrostatic suspension arrangement for a macroscopic charged particle such that the particle can provide an indication of force in any direction in a highly accurate and sensitive manner.

It is a more specific object of my invention to provide a highly sensitive accelerometer arrangement utilizing a plurality of substantially orthogonally disposed electrodes defining an electrostatic suspension system for a charged particle, with movements of said particle from a null position as a result of acceleration resulting in the development of forces accomplishing a return of said charged particle to the null position as well as the development of a useful output.

These and other objects, features, and advantages will be more apparent from a study of the appended drawings in which:

FIGURE 4 is a diagram about the vertical or Z axis, showing the no deflection position of the charged particle;

Figure 6:
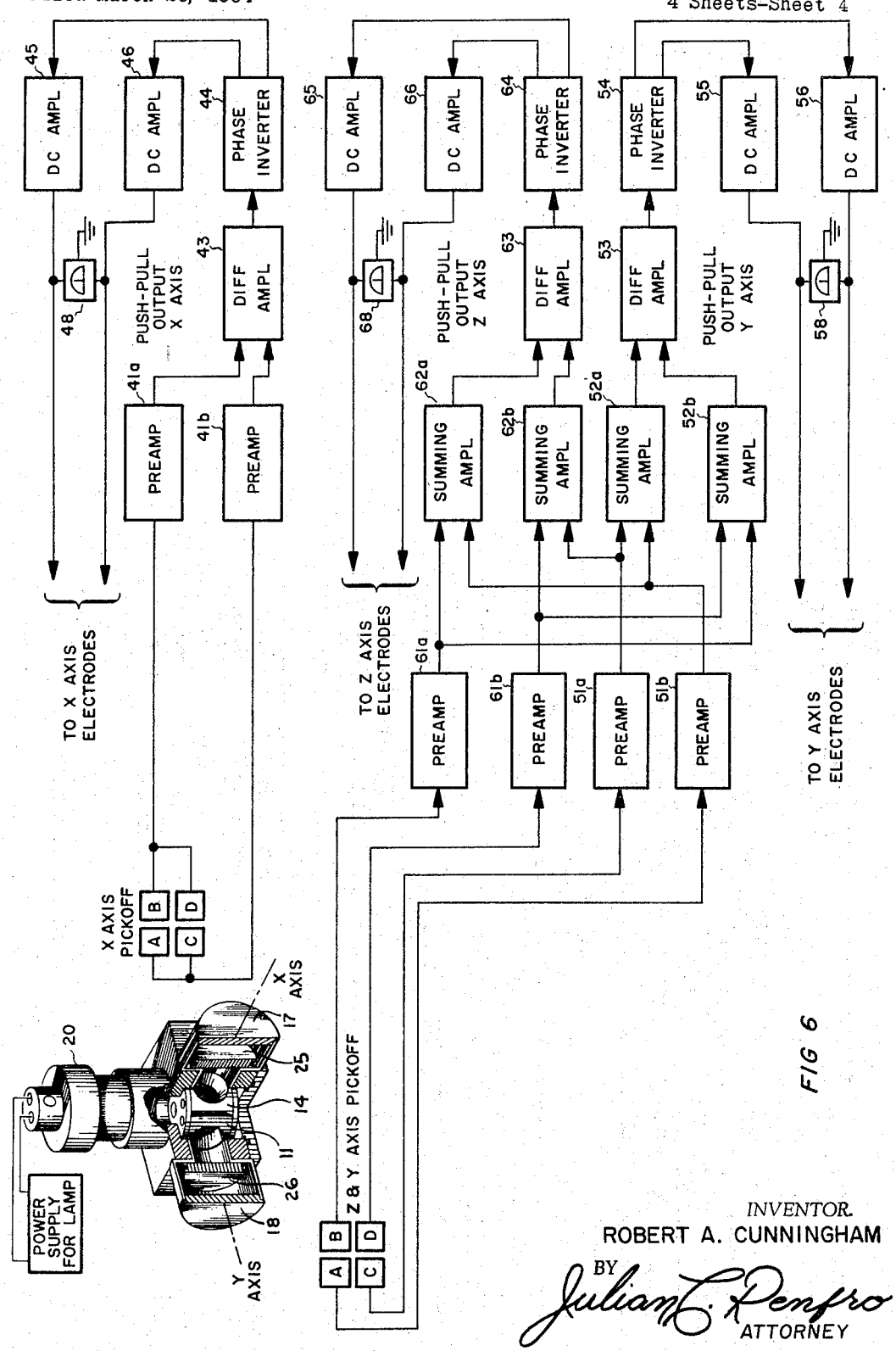

FIGURE 5 is a diagram related to FIGURE 4 in which deflection about the Z axis causes the Y-Z axis pickoff to record an unbalanced illumination; and FIGURE 6 is a detailed block diagram of an exemplary embodiment of my invention in which three amplifier systems are connected with the appropriate optical pickoffs to supply electrical signals to the related plates of the suspension chamber to balance the inertial forces on the particle, this figure also including a small showing of the external appearance of my accelerometer with portions cut away to reveal internal construction.

Figure 1:
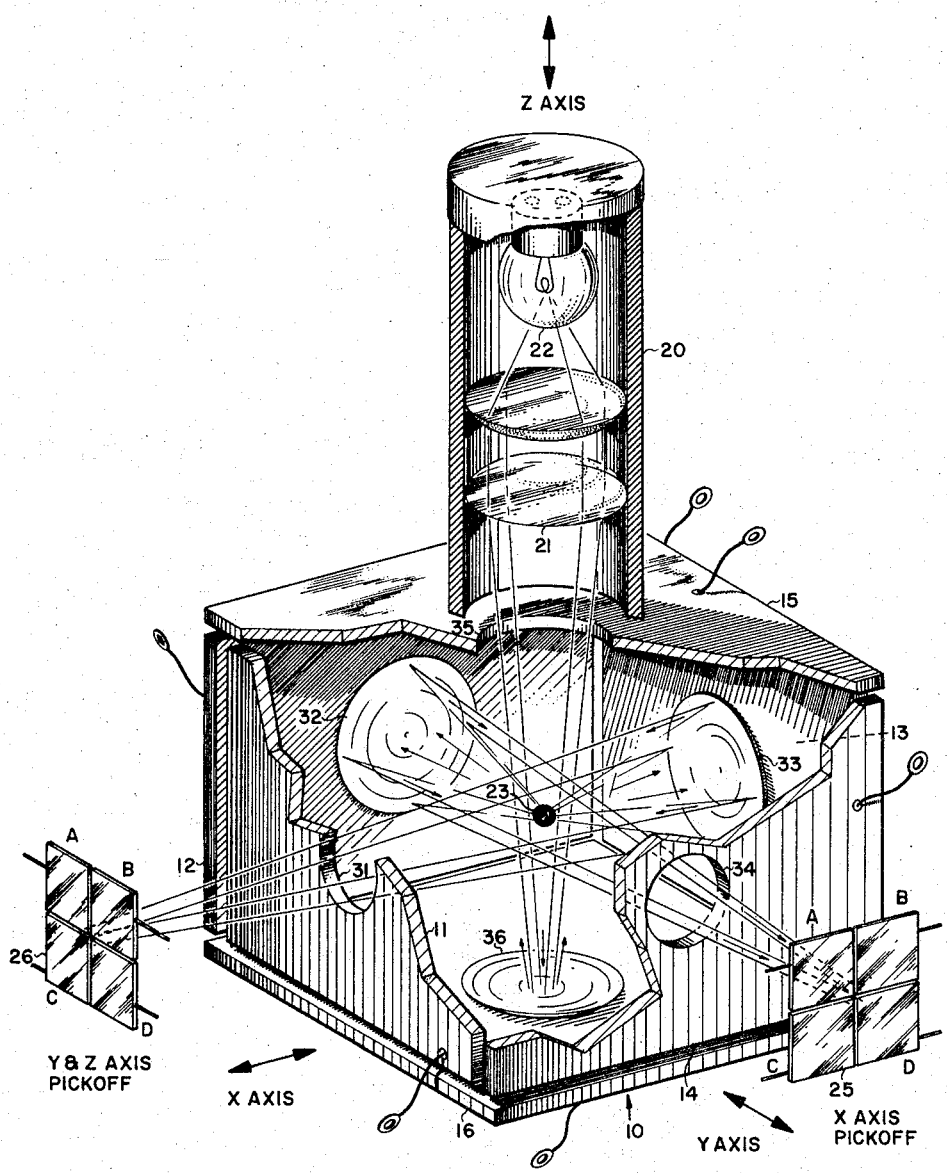
FIGURE 1 is a simplified perspective view of an exemplary configuration of my device, with portions cut away to reveal the cubic array of plates, the illumination of the particle, and the optical arrangements of the pickoffs.

Referring to FIGURE 1, the exemplary electrode arrangement 10 is revealed in the general manner in which it may appear in the housing shown in FIGURE 6. Portions of the electrodes or plates are cut away for the purpose of illustrating the preferable cubic arrangement of plates between which an electrostatic field is created in accordance with this invention to provide a desirable suspension for charged particle 23. Plates 11, 12, 13 and 14 are disposed in a 360 degree array in the housing, preferably spaced slightly apart as shown, whereas upper end plate 15 and lower end plate 16 are disposed slightly above and below the field electrode plates and approximately perpendicular to the plane of these plates so as to define therewith a substantially cubic array or suspension chamber. By an appropriate system of electric connections to the electric leads shown on these plates, the desired electrostatic field is created between opposite plates, thus to enable acceleration forces to be balanced with electrical forces. The plates 11 through 16 are of a conductive material such as brass, may be ⅜" on a side, and the gaps between plates may be 1/16".

The basic concept upon which this invention is grounded involves the placement of a charged particle in electrostatic suspension, where it will be sustained in stable equilibrium in resistance to disturbing forces. By virtue of the charged particle being suspended in the electrostatic field, it can function, as previously indicated, as an acceleration sensitive mass, completely free of friction and other undesirable forces, thus admirably equipping the present instrument for extremely precise measurements of inertial forces. In this context, I prefer to evacuate the portion of the housing in which the plates are located, thus to minimize viscous damping.

The charged particle 23 may be in the form of a hollow glass bead having a diameter of 75 microns. Such beads may be purchased commercially from Emerson & Cuming, Inc. of Canton, Mass. In the event such beads are used, they are inserted by the use of a small glass nozzle (not shown), with a conductor being disposed in the nozzle in contact with the glass beads, which are repelled through the high gradient in the electrostatic field caused by a high voltage placed on the conductor. The arrangement may be such as to charge the particles either positively or negatively in polarity. Although a number of these small particles may be injected at a time into the chamber, only one particle will be captured and suspended by the force balance system.

Alternatively, the particle may have a metallic coating applied to the surface thereof to improve its light reflectivity, and in such instance I prefer to use a chemically deposited silver coating on the particles.

In view of the small size of the bead or particle, it is necessary to provide a relatively substantial amount of illumination therefor, and to that end I provide a light source 22, such as a thirty candlepower incandescent lamp disposed in light tube 20. The light from the lamp is gathered in a condensing lens system 21, which serves to concentrate the light at the null position of the particle in the center of the chamber. Light reflected from the particle is gathered by spherical mirrors 32 and 33, whose focal lengths are such that light will be focused upon pickoffs 25 and 26, respectively. These pickoffs observe and utilize the position of the charged particle with respect to the X, Y, and Z axes and are disposed in two perpendicular optical systems. A spherical mirror 36 may be employed below particle 23 if additional light gathering be necessary.

As shown in FIGURE 1 with regard to the X axis, mirror 32 directs through aperture 34 in plate 14 the light reflected from particle 23 and normally focuses it in equal amounts upon the sensitive surfaces A, B, C, and D of X axis pickoff 25. Similarly, mirror 33 is arranged to focus light from particle 23 through aperture 31 onto the sensitive surfaces A, B, C, and D of Y-Z pickoff 26. In each instance the light is proportioned equally upon each sensitive surface when the particle is in the non-displaced position, but any change of position of the particle due to a change in acceleration results in more light falling on one portion of the sensitive surface than another of the respective pickoff, and brings about an electrical signal for the correction of particle position. For the pickoffs I prefer to use a quadrant cell of silicon diffused junction photo-voltaic material similar to type M–7008 material supplied by Texas Instruments, Inc. of Dallas, Tex.

As will be seen in connection with FIGURE 6, the quadrants of pickoffs 25 and 26 may be electrically connected so that any electrical unbalance resulting from more light falling on one quadrant (or pair of quadrants) than another as a consequence of particle movement will result in the generation of an electrical signal that is used in accordance with this invention to bring about the restoration of the particle to the null position by appropriate voltages on the appropriate plates. Thus if the particle moves in a direction perpendicular to the line of sight of the cells, and perpendicular to the junction between the cells, the light will increase on one cell and decrease on the other. Since cell current is proportional to the light falling on a cell, the cell current will change as a function of particle position, and this current can be used as the error signal for a force balance servo system. In this manner, therefore, the movements of particle 23 with respect to the X, Y, and X axes will be noted and appropriate corrective signals generated for bringing about restoration of the particle in the center of this force balance system. FIGURES 2 through 5 illustrating particle deflections will be discussed hereinafter.

Referring to FIGURE 6, it will be noted that X axis pickoff 25 is disposed in pickoff housing 17, and Y and Z pickoff 26 is disposed in pickoff housing 18. The entire device weighs only a matter of ounces. The sensitive areas of the pickoffs are not to be seen in the pickoff housing in this figure, but are to be noted in adjacent enlarged showings in which the portions of each quadrant have been designated A, B, C, and D. The quadrants A and C of X axis pickoff 25 are connected in parallel to preamplifier 41b so that the current output of the silicon cell can be amplified and converted to a voltage adequate for subsequent operations. Likewise, quadrants B and D are connected in parallel to preamplifier 41a, where their output is amplified in a manner identical to that of quadrants A and C. The outputs of 41a and 41b are subtracted by a different amplifier 43, whose output amplitude is proportional to the position of the particle in the X axis.

This position signal from the differential amplifier 43 is inverted by phase inverter 44 to give two signals, one positive and one negative, which are separately applied to the DC amplifiers 45 and 46. These DC amplifiers are used to provide electrical signals to the suspension chamber electrodes 11 and 13, which control the positioning of the particle in the direction of the X axis. These electrical forces cancel or null the acceleration forces of the particle, thus closing the loop of the servo system. The amplifiers 45 and 46 are each capable of either a positive or negative output, with the output of each amplifier always being balanced in this embodiment of the invention by an identical voltage of the opposite polarity on the other amplifier. Since the DC polarity of the plates must reverse to match accelerations, so these components must operate in either positive or negative polarity. This arrangement, commonly called a push-pull output, provides the preferred method to accomplish the serving of the particle, although it is equally possible to use a single ended output to a single plate, with the opposite plate, if used, being grounded. In this context it should be noted that as few as three orthogonally disposed plates may be used, each of which must be arranged to repel or attract the charged particle as may be required at each instant to hold it in proper suspension.

Figure 2:
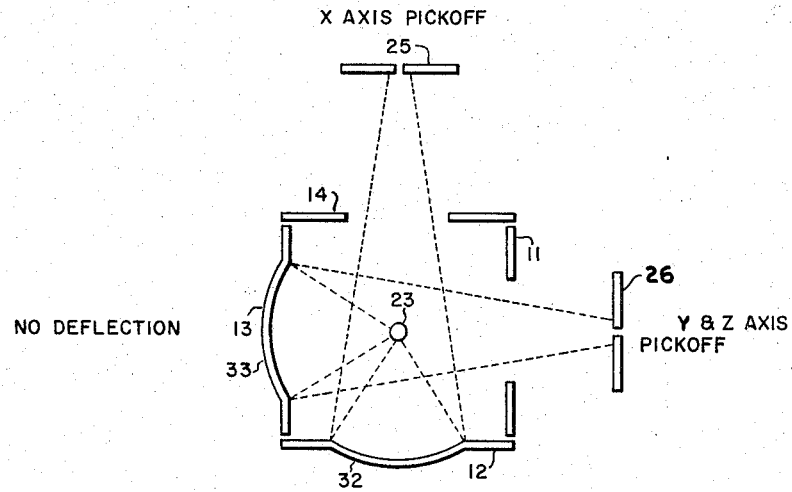
FIGURE 2 is a simplified diagram showing a horizontal cross-section of a particle suspension arrangement in accordance with this invention in which a charged particle is shown in the no deflection position with respect to the plates, with the pickoffs having balanced light outputs.
Figure 3:
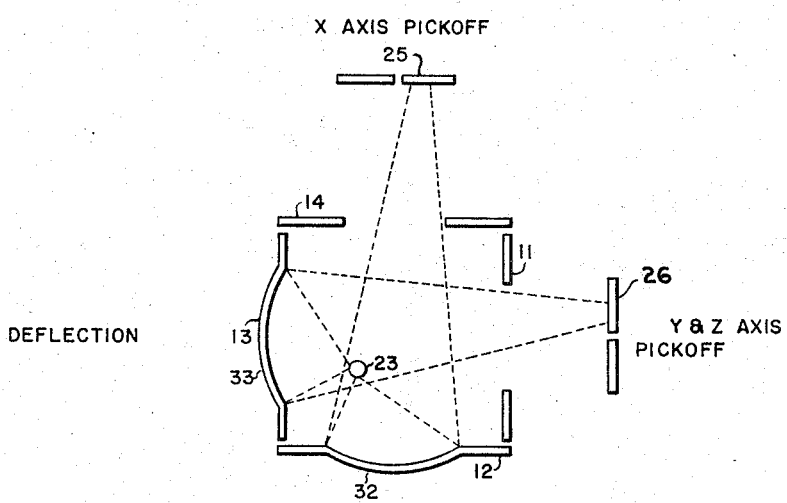
FIGURE 3 is a diagram similar to FIGURE 2 but showing the particle in a deflected position with respect to the X and Y axes, thus bringing about unbalanced illumination of the pickoffs.

Referring to FIGURES 2 and 3, when the accelerometer is subjected to an acceleration force, the particle may tend to move away from the null position shown in FIGURE 2, and into the position shown in FIGURE 3. The image of the particle as focused on the X axis pickoff 25 by the spherical mirror 32 falls on the quadrant type photocell so that the light is on quadrants AC and off of the quadrants BD. The image of the particle falling on quadrants AC generates a current, thus unbalancing the signals leading into the differential amplifier 43. This difference signal is then applied to phase inverter 44, as previously explained, to provide a push-pull output through DC amplifiers 45 and 46. The voltage is then applied to plates 11 and 13 in such a manner that the particle is attracted by the voltage on plate 11 and repelled by the voltage on plate 13, to cause the particle to move to its null position. For the sake of clarity, the motion of the particle has been purposely exaggerated in FIGURES 3 and 5, for in actuality the servo will maintain the position of the particle very precisely to a null position, from which deviation is less than 0.10 micron.

In order to utilize this device as an accelerometer, it is necessary to have a convenient output, which is typically in the form of a voltage necessary to balance the inertial forces of the particle. The voltage as read by meter 48 is proportional to the acceleration of the particle in the X axis.

The Y and Z axes pickoff 26 similarly uses a quadrant photo voltaic cell, but is connected in a somewhat different manner to obtain two axes output. Note that FIGURE 5 illustrates light falling on the Y-Z pickoff in a non-symmetric manner as a result of acceleration. Quadrants A, B, C, and D are individually connected to preamplifiers 51b, 61a, 51a, and 61b to convert the current signals from the cells from a current to a voltage output. The summing amplifiers 62, 62b, 52a and 52b each take the sum of a pair of opposite quadrants. Thus summing amplifier 62a adds the output of cells A and B, summing amplifier 62b adds the output of cells C and D, 52a adds the output of cells A and C, and 52b adds the outputs of cells B and D.

The outputs of summing amplifiers 62a and 62b are then subtracted in the differential amplifier 63 and this difference voltage represents the position of the particle on the Z axis. This voltage is applied to a phase inverter 64 and DC amplifiers 65 and 66 arranged to provide a push-pull output signal to the Z axis plates 15 and 16.

The outputs of summing amplifier 52a and 52b are subtracted by the differential amplifier 53, this voltage representing the position of the particle on the Y axis. This signal is phase inverted by inverter 54, and then applied to a push-pull DC amplifier output similar to that of the X and Z axes. The output of amplifiers 55 and 56 are applied to plates 12 and 14 to provide an electrical signal to balance the inertial forces on the particle along the Y axis. Meter 58 is used as a readout of the voltage representing this acceleration. Calibration is accomplished by accurately orienting the device in a one G environment and reading the voltage equal to one G.

As will be obvious, simultaneous Y and Z axis movements may for example result in only one of the four quadrants being illuminated, which will of course bring about activity in both channels. Similarly, multi-channel operation follows deflections with respect to the X axis in concert with movement with respect to the Y or Z axis.

As is therefore to be seen, the output amplifiers are used to provide electrical forces to cancel or null the acceleration forces on the charged particle, thus amounting to a highly effective servo system. The use of the six amplifiers 45, 46, 55, 56, and 65, 66 in a push-pull arrangement is a preferable biasing arrangement for the plates inasmuch as it is necessary to arrange the polarity provided to each of the plates such that an electrical force will be created which is opposite to the acceleration force on the particle. This is to say, the acceleration force may be in either direction with respect to a given pair of plates, so therefore the DC polarity of the plates must reverse to match such acceleration. I have found by subjecting my device to high speed vibration that vibrations up to and including 1800 cycles per second can be accommodated without exceeding the dynamic response capabilities of my device.

The output voltages for the X, Y, and Z channels may be read from the output volt meters 48, 58, and 68 respectively. Such readings for example, may be from 1 volt to 100 volts per G. However, in the use of my invention, the meters 48, 58 and 68 may be eliminated and the signal from each channel of the accelerometer directly connected to a missile control system, for example. In such instance, any error in missile acceleration would result in an error signal to be fed to the guidance computer of the missile so as to accomplish appropriate corrective positioning of the missile control surfaces.

My invention therefore comprehends and constitutes a force balanced or null servo system which is very advantageous in instruments which require good linearity and high accuracy. As will now be apparent to those skilled in this art, this is a servo mechanism in which the output of each pickoff is the error signal which is amplified and fed back to the electrodes in a phase relationship that will oppose the inertial force with an equal and opposite electrical force. Feedback is negative and will maintain a stable system so that the charged particle will be always electrically controlled to the center of the six electrode chamber defined by the optical pickoffs. A minimum error signal is maintained as in any stable servo system.

Standard components are involved in the arrangement shown in FIGURE 6. For instance, all of the units shown for preamplifier, differential amplifiers, phase inverters, and DC amplifiers may be constructed from a standard building block type of component, such as a Philbrick type 65B operational amplifier commonly available from George A. Philbrick Researches, Inc., 127 Clarendon St., Boston, Mass.

Turning to FIGURES 4 and 5, it is to be seen that as the particle 23 is caused by changes in acceleration to move from the null position shown in FIGURE 4 to the deflected position shown in FIGURE 5, the light from source 22 is caused to be projected onto one or perhaps two quadrants of the Y-Z pickoff 26, depending upon the angle at which acceleration takes place. As previously indicated, my device operates in a highly satisfactory manner despite the fact that accelerations to which the device may be subjected do not coincide with any of the three axes. Further, the null location for the particle 23 does not have to be in the center of the device, but may if desired be caused in special applications to be located nearer one plate than another.

I have herein described an optical pickoff arrangement, but it is to be noted that other arrangements may be used for this purpose, such as electrostatic, magnetic or even other optical arrangements. Such other optical method could operate on the position of the particle perpendicular to the line of sight of the optical pickoffs. As to the electrostatic pickoff arrangements, this method would use the motion of the charged particle inducing a voltage in the electrodes which could be separated from the suspension voltage. A magnetic pickoff may be desired by utilizing the magnetic field created by a charged particle in motion, or the charged particle itself may be a magnetic material. Pickoff would be accomplished by surrounding the chamber with coils of wire.

Despite the fact that I have described my invention as primarily being an acceleration sensing device, it must be borne in mind that this invention is one of considerable breadth and accordingly capable of being utilized in other environments and is for other purposes than stated hereinbefore. For example, a particle of material may be charged and placed in a chamber. Measurements can be made of the magnetic and electrical properties of materials by measuring the deflection when the chamber is placed in an external magnetic field. Another example may involve the measurement of vacuum by connecting the chamber to a vacuum to be measured, with the indication of pressure being observed by the particle deflection as influenced by the buoyancy of the gases remaining in the vacuum. For a vacuum measuring device, it is not necessary to provide for observation of the particle's displacement along three axes, and to this end I may provide only a single axis observation arrangement.

As to the charging means, there are many possible arrangements for supplying either a charged solid particle or a charged droplet such as of oil to the chamber, but a preferred method involves the use of hypodermic needle connected to a reservoir of fluid with the hypodermic needle momentarily raised to a high potential. The droplets are of course injected into the chamber while the control system is in operation.

It should be noted that the charged particle may be charged either positively or negatively, for a given servo arrangement will function in a given manner in either case. However, the polarity of the output signals if read on output meters will be opposite in the two instances.

Thus it will be seen that a very sensitive device has been provided for the effective measurement of acceleration, weighing only a matter of ounces yet capable of measuring high shock and accelerations in the order of many thousands of G's.

Other embodiments within the spirit of this invention will become apparent to those skilled in this art, and all embodiments that come within the scope or range of equivalency of the appended claims are intended to be included therein.

I claim:

1. An acceleration sensing device utilizing a particle of high charge to mass ratio without using alternate gradient focusing containment of such particle, said device comprising at least three substantially orthogonally disposed electrodes defining a part of a suspension system by which said particle is supported and with respect to which said particle may move in response to accelerations, said suspension system including means for selectively providing voltages to said electrodes to create electric forces to hold said particle at a null point common to said electrodes, pickoff means for sensing deviations of said particle from said null point, said pickoff means arranged in a quadrant array, direct current amplification means for amplifying the output signals from said pickoff means and for applying only a direct current counter electric force to the appropriate electrodes to maintain said particle in said null position, and means for utilizing the signal necessary to null out said particle as the readout of the acceleration forces to which said device is subjected.

2. The device as defined in claim 1 in which each of said electrodes is faced by an additional electrode, with which it forms a pair of electrodes disposed on opposite sides of said null position, said additional electrodes each being connected to ground or other reference voltage.

3. The device as defined in claim 1 in which each of said electrodes is faced by an additional electrode, with which it forms a pair of electrodes disposed on opposite sides of said null position, each electrode of each pair of electrodes receiving a counter electric force of opposite and equal polarity representing a push-pull output.

4. An acceleration sensing device utilizing a particle of high charge to mass ratio without using alternate gradient focusing containment of such particle, said device comprising a plurality of electrodes defining an essentially closed array providing an electrostatic suspension system between said electrodes so that said particle will be maintained at a null location common to said electrode array, a direct current force balance arrangement for maintaining said particle essentially in said null position despite substantial accelerations to which said device may be subjected, said force balance arrangement including pickoff means for sensing movements of said charged particle as a result of accelerations, said pickoff means being arranged in a quadrant array, direct current amplification means to which said pickoff means is arranged to supply output signals, said amplification means having an output, means for applying the output of said amplification means to the electrodes most nearly relatable to the direction in which, as a result of acceleration, said particle is tending to move, for thus causing said particle to return to the null position, whereby said particle remains in the null position in the electrode array so as to be able to sense accelerations in any direction, and means for providing from the amount of voltage required to balance out said particle and return it to the null position, a signal related to the acceleration to which said device is subjected.

5. The device as defined in claim 4 in which three electrode pairs are employed, which together define as substantially cubical array.

6. The device defined in claim 4 in which said pickoff means are optical.

7. An acceleration sensing device utilizing a particle of high charge to mass ratio but using no alternate gradient focusing containment of such particle, said device comprising six electrodes, said electrodes being utilized in three pairs disposed to define an essentially closed array which provides an electrostatic suspension system between said electrodes such that said particle will be maintained at a null location in approximately the center of said array, a force balance arrangement utilizing only direct current amplification for maintaining said particle essentially in said null position despite substantial accelerations to which said device may be subjected, said force balance arrangement including optical pickoff means arranged in a quadrant array for sensing movements of said charged particle as a result of accelerations, direct current amplification means to which said pickoff means is arranged to supply position related output signals, said amplification means having push-pull outputs, means for applying properly phased push-pull outputs from said amplification means to those of the electrode pairs most nearly relatable to the direction in which, as a result of acceleration, said particle is tending to move and create an error signal which causes a counteracting static force, thereby to cause said particle to return to the null position, whereby said particle remains in the null position in the electrode array so as to be able to sense accelerations in any direction, and means for providing an indication of the acceleration to which said device is subjected by virtue of the amount of direct voltage required to balance out the forces on said particle and return it to the null position.

8. An acceleration sensing device utilizing a particle of high charge to mass ratio but using no alternate gradient focusing containment of such particle, said device comprising six electrodes, said electrodes being utilized in three orthogonally related pairs disposed to define an essentially closed array providing an electrostatic suspension system between said electrodes so that said particle will be maintained at a null location in approximately the center of said array, a force balance arrangement utilizing only direct current amplification for maintaining said particle essentially in said null position despite substantial acceleration with respect to one or more axes of the three orthogonal axes, said force balance arrangement including pickoff means arranged in a quadrant array for resolving movements of said charged particle as a result of accelerations into voltage information related to one or more respective axes, direct current amplification means related to each axis to which said pickoff means are arranged to supply position related output signals, means for applying a properly phased output of each amplification means to its respective electrode pair, thereby to cause said particle to return to the null position, whereby said particle remains in the null position in the electrode array so as to be able to sense accelerations in any direction, and means for providing an indication of the acceleration to which said device is subjected by virtue of the amount of direct voltage required to balance out said particle and return it to the null position.

9. The device as defined in claim 8 in which each of said amplification means has a push-pull output.

References Cited

UNITED STATES PATENTS

| | | |
|---|---|---|
| 3,003,356 | 10/1961 | Nordsieck. |
| 3,011,347 | 12/1961 | Boitnott. |
| 3,065,640 | 11/1962 | Langmuir et al. _____ 73—517 |
| 3,146,057 | 8/1964 | Rona. |
| 3,148,456 | 9/1964 | Browning. |

JAMES J. GILL, *Primary Examiner.*

RICHARD C. QUEISSER, *Examiner.*